Jan. 3, 1967  R. W. FISHER ETAL  3,295,355
ACCELEROMETER HAVING SELF-TESTING MEANS
Filed Nov. 9, 1964
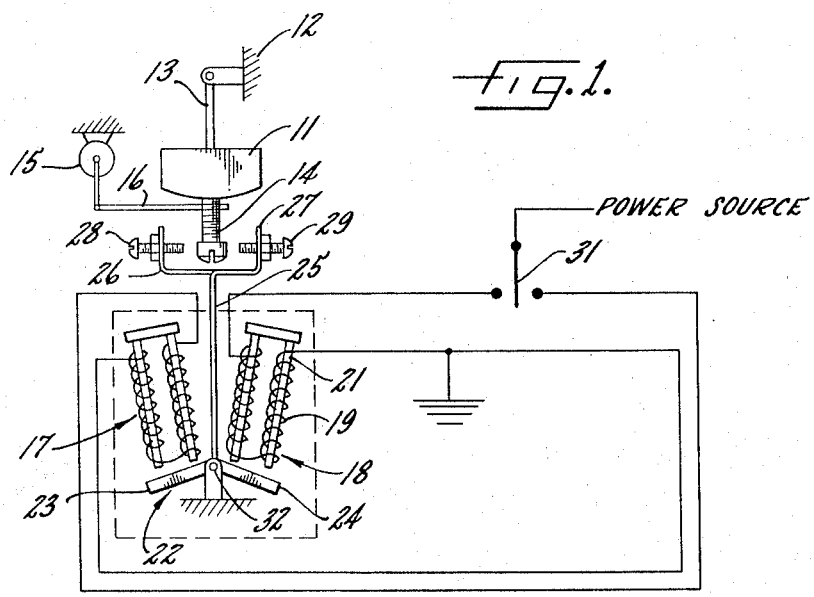
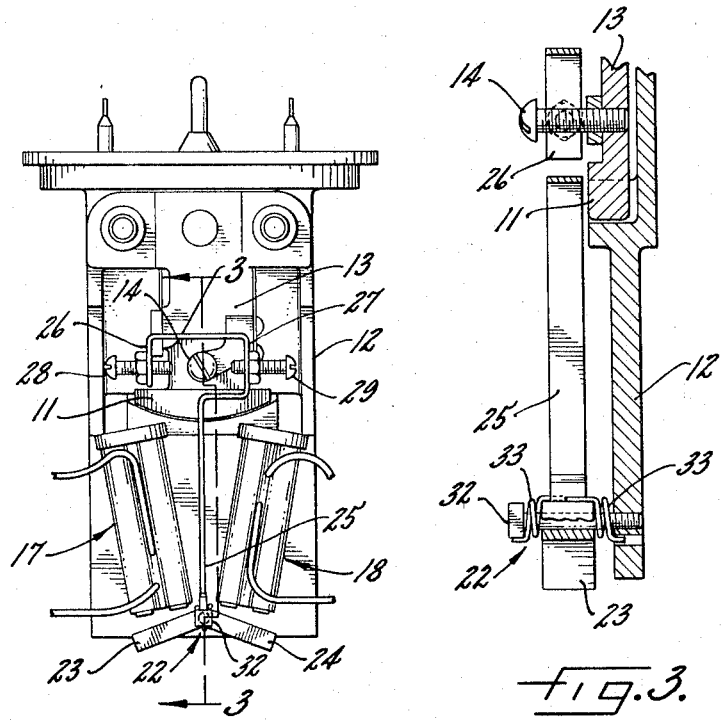
INVENTORS.
RALPH W. FISHER
HAROLD W. HOSSFELD
MARTIN D. SETTLES
BY
*H. H. Losche*
*Paul S. Collignon* ATT'YS.

United States Patent Office 3,295,355
Patented Jan. 3, 1967

3,295,355
ACCELEROMETER HAVING SELF-TESTING MEANS
Ralph W. Fisher, St. Charles, Harold W. Hossfeld, O'Fallon, and Martin D. Settles, Florissant, Mo., assignors, by mesne assignments, to the United States of America as represented by the Secretary of the Navy
Filed Nov. 9, 1964, Ser. No. 410,040
2 Claims. (Cl. 73—1)

The present invention relates to an accelerometer and more particularly to an accelerometer that has self-testing means integral therewith.

The fundamental working principle of any accelerometer is embodied in Newton's second law, briefly written as force equals mass times acceleration. An accelerometer consists of a constant mass which is freely suspended so that an acceleration along the sensitive axis of the instrument produces a force which is used in some way to generate an output response.

Various types of accelerometers are used in military aircrafts with some providing a proportional output and some providing a switch action output when a predetermined acceleration is reached. While accelerometers can be readily checked prior to installation in a vehicle, such as by spinning on a centrifuge, after installing in a vehicle the only method of testing heretofore available accelerometers was to accelerate the vehicle itself which made an accuracy determination most difficult.

In the present invention, an arm is provided that is engageable with the sensitizing mass of the accelerometer, and electromagnetic means are provided for moving the arm in either of two directions. Movement of the arm, in turn, moves the mass thus simulating the application of acceleration to the unit. By suitable monitoring of the output circuits of the accelerometer, a determination can readily be made as to whether the accelerometer is in satisfactory condition.

A general object of the present invention is to provide a new and novel accelerometer adaptable for measuring both acceleration and deceleration forces and which has self-testing means integral therewith.

Another object of the present invention is to provide means for testing an accelerometer by simulating an acceleration condition and monitoring the output circuits.

Other objects and advantages of the present invention will be readily appreciated as the same becomes better understood by reference to the following detailed description when considered in connection with the accompanying drawing wherein:

FIGURE 1 is a diagrammatic view of the present invention;

FIGURE 2 is a top plan view of a preferred embodiment of the present invention; and FIGURE 3 is a sectional view taken on line 3—3 of FIGURE 2.

Referring now to the drawing, a sensitizing mass 11 is pivotally mounted to housing 12 by means of an arm 13. A balancing screw 14 is threadedly attached to mass 11, and an output device 15, such as a rotary switch, is connected to balancing screw 14 by means of linkage 16.

A pair of energizing coils 17 and 18 are provided, with each coil, consisting of a winding 19 around an iron core 21. An armature 22 is pivotally attached to housing 12 and legs 23 and 24 of armature 22 are adjacent one end of coils 17 and 18, respectively. An arm 25 has one end connected to armature 22 and the opposite end is bent to provide two parallel sides 26 and 27. Adjusting screws 28 and 29 are threadedly attached to sides 26 and 27, respectively.

In operation, adjusting screws 28 and 29 are spaced a sufficient distance from balancing screw 14 to permit normal operation of the accelerometer. Upon energizing coil 17 by closing switch 31, leg 23 of armature 22 will be attracted by coil 17 thereby causing armature 22 to be pivoted about shaft 32. Movement of armature 22 causes arm 25 to move and screw 28 will come into contact, and move balancing screw 14 and consequently, mass 11. Any movement of mass 11 will affect output device 15 and by suitably monitoring device 15 it can readily be determined whether or not the accelerometer is operating properly. Likewise, upon energizing coil 18, leg 24 of armature 22 will be attracted by coil 18 thereby causing armature 22 to be pivoted in the opposite direction about shaft 32. This causes screw 29 to come into contact with, and move balancing screw 14 and consequently, mass 11. Spring 33, is provided to keep arm 25 centered between adjusting screws 28 and 29 thereby providing sufficient clearance between the adjusting screws and the balancing screw 14 to permit normal operation of the accelerometer.

The self-testing means can be employed with various types of accelerometers, such as linear and g-limit accelerometers. For linear type accelerometers, the test checks in-phase and out-of-phase outputs when the mass is deflected first one way and then the other. The test also indicates whether or not the output windings are open. For g-limit accelerometers the test indicates whether or not the limit switches are operating when the mass is deflected first one way and then the other.

Obviously many modifications and variations of the present invention are possible in the light of the above teachings. It is therefore to be understood, that within the scope of the appended claims, the invention may be practiced otherwise than as specifically described.

What is claimed is:
1. An accelerometer comprising:
a housing,
a mass pivotally mounted to said housing,
a balancing screw threadedly attached to said mass,
an output device,
means connecting said output device to said mass,
first and second electromagnetic coils,
an armature pivotally connected to said housing, said armature having a first leg extending outwardly and adjacent one end of said first electromagnetic coil and a second leg extending outwardly and adjacent one end of said second electromagnetic coil, said armature having a reverse-bent arm providing first and second parallel sides,
means for selectively energizing said first and second electromagnetic coils, and
first and second adjusting screws threadedly attached one each to said first and second parallel sides, said adjusting screws being engagable with said balancing screw.

2. An accelerometer as set forth in claim 1 wherein said armature is spring biased whereby said first and second adjusting screws are maintained out of engagement with said balancing screw thereby permitting said mass to be freely acted upon by the force of acceleration.

References Cited by the Examiner
UNITED STATES PATENTS
2,923,904  2/1960  Hieber _____ 73—1
2,949,026  8/1960  Gindes et al. _____ 73—1
3,161,064  12/1964 Johnston _____ 73—503 X RICHARD C. QUEISSER, Primary Examiner.
JAMES J. GILL, Examiner.